UNITED STATES PATENT OFFICE.

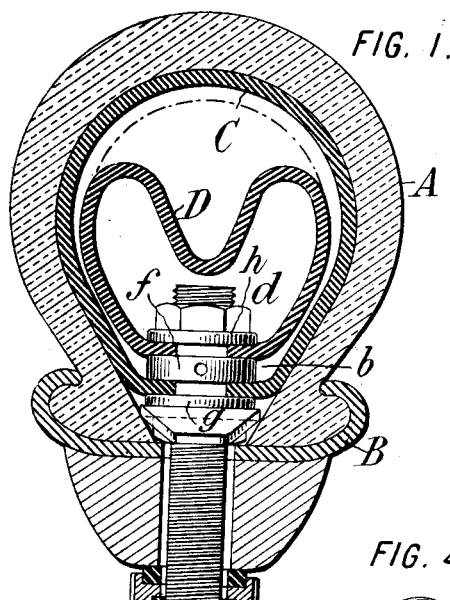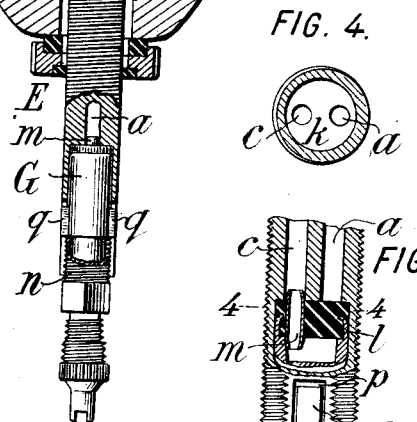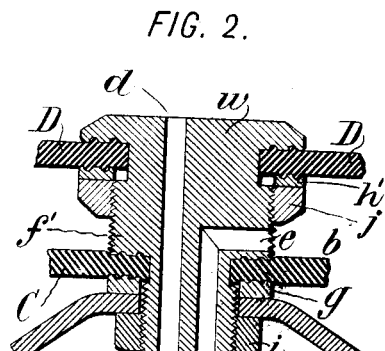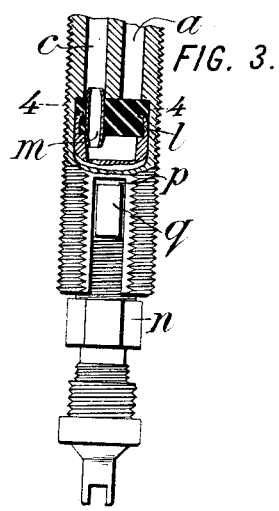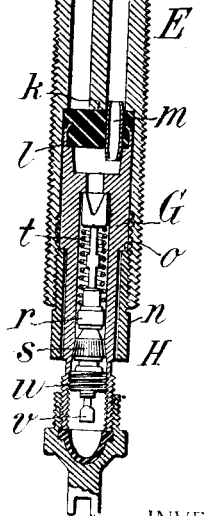

HENRY P. KRAFT, OF NEW YORK, N. Y., AND MAXIMILLIAN CHARLES SCHWEINERT, OF WEST HOBOKEN, NEW JERSEY, ASSIGNORS TO A. SCHRADER'S SON, INCORPORATED, OF NEW YORK, N. Y., A CORPORATION OF NEW YORK.

TIRE-VALVE.

1,178,809. Specification of Letters Patent. Patented Apr. 11, 1916.

Application filed February 9, 1906. Serial No. 300,330.

*To all whom it may concern:*

Be it known that we, HENRY P. KRAFT, residing in the borough of Brooklyn, county of Kings, city and State of New York, and MAXIMILLIAN C. SCHWEINERT, residing in West Hoboken, in the county of Hudson and State of New Jersey, citizens of the United States, have invented certain new and useful Improvements in Tire Valves, of which the following is a specification.

This invention relates to a tire valve for use in connection with tires having two or more air tubes, arranged, one within the other, or in any other suitable manner. This type of tire usually consists of two air tubes, one within the other, and an outer shoe or tread, the air tube lying next to the outer shoe being normally inflated and the innermost tube being used in case of puncture of the outer shoe and the outer air tube. This construction involves the use of means for separately inflating both air tubes, and such means have ordinarily consisted of two separate valves, the one for the inner tube passing through the outer tube.

Our invention in its preferred form provides a single valve which is adapted to control the admission of air to either one or the other of such tubes, and preferably such valve is carried by a single casing or other member which communicates with the interior of the inner tube and the space between the walls of such tube and those of the outer tube.

Our invention also includes certain other features of improvement which will be hereinafter referred to.

In the drawings illustrating certain embodiments of our invention, Figure 1 is a cross section of a double air tube tire showing one form of our improved valve partly in elevation and partly in longitudinal section; Fig. 2 is a longitudinal section of the preferred form of valve on an enlarged scale; Fig. 3 is a similar view of the lower part of Fig. 2, showing the end of the valve in elevation; Fig. 4 is a cross section on the line 4, 4, in Fig. 3.

In the drawings A designates the outer shoe of an automobile tire which is held in channels upon the wheel rim B, or is otherwise connected to the latter.

C and D designate two air tubes within the shoe A, the inner tube D lying wholly inside of the outer tube C. The outer tube C is normally used to expand the tire and the inner tube D is inflated when by reason of any accident, such for instance as a puncture, the outer tube C becomes perforated. In its inflated condition the tube D lies along the inner side of the tube C as shown in dotted lines in Fig. 1. In what are known as "hose pipe" tires, the outer shoe A is made as an imperforate tube, and in this case only a single auxiliary air tube such as D is usually provided for use in case of puncture of the outer tube.

Our improved valve is indicated as a whole by the letter E. It preferably includes a casing or other member F having a passage *a* leading to the space *b* between the inner and outer tubes and a passage *c* leading to the space *d* within the inner tube D, combined with means for controlling the introduction of air through such passages to inflate the respective tubes.

The casing F is preferably provided with means for clamping both of the tubes with a leak-tight joint, whereby to prevent communication between one tube and the other or with the outer air. Such clamping means are preferably arranged so as to separate the inner and outer tubes at this point in order that the air may freely pass through the lateral extension *e* of the passage *a* into the space *b*. Preferably we provide the casing with a flange *f* having an air-tight connection with the casing, which flange lies between the tubes and forms a clamping face for at least one of the tubes. In the construction shown the flange is formed as an integral part of the casing, the lateral extension *e* of the passage *a*, passing through the flange as shown in Fig. 1. Means are provided for clamping one of the tubes C and D at each side of the flange, the means shown in Fig. 1 consisting of washers *g*, *h*, which clamp the walls of the tubes against sides of the flange, nuts *i*, *j*, screwing on outer wall of the casing F, being provided for this purpose. The opposite faces of the flange and washers are formed with the usual grooves as shown in Fig. 2.

According to the preferred form of our invention we utilize a single valve for controlling the ingress and egress of air through the passages *a* and *c* of the casing. For this purpose we provide means for connecting the valve with either of the passages, as occasion requires. In the construction illustrated we provide a valve shell G, adapted to fit within the casing and carrying a complete valve proper H, such valve shell having a port or opening at its inner end which is designed to be connected with either of the passages $a$, $c$. For this purpose the valve shell G is adapted to be connected with the casing F in two positions, in one of which its port registers with the passage $a$ and in the other of which with the passage $c$.

In the construction shown the casing F is formed with a seat $k$ (Figs. 2 and 4) to which the outer ends of the passages $a$, $c$ lead, such passages in this construction being formed eccentrically within the casing as best shown in Fig. 4. The valve shell G in this construction carries at its inner end a packing $l$ which is formed with an eccentric opening constituting the port of the casing in which is carried a tube or thimble $m$, the protruding end of which is adapted to project within the passage $a$ or $c$ in the several positions of the valve shell. The imperforate portion of the packing $l$ is adapted to form a leak-tight closure for the passage $a$ or $c$ which is not in use and is also adapted to press against the surrounding walls of the casing F and prevent leakage of air between the casing and the valve shell. The valve shell is adapted to be forced to its seat to compress the packing $l$ by a screw-threaded sleeve $n$ engaging the inner wall of the casing, and bearing against a shoulder $o$ formed upon the shell. Preferably the shell and casing are so formed as to limit the number of positions which the shell is capable of assuming within the casing to those required by the number of passages which the valve proper is adapted to control, in the present instance two. This may be accomplished in the manner shown wherein the casing is formed with oppositely arranged slots $p$ designed to receive lugs $q$ formed upon the valve shell, this construction also causing the shell to enter the casing with a non-rotative movement thus avoiding distortion of the packing $l$.

Our invention, broadly speaking, is not limited to any particular type of valve proper. That shown is the well known Schrader universal valve comprising a valve member $r$ which is pressed against the seat $s$ by a spring $t$, the latter being held in position by a screw plug $u$, the various parts of the valve being connected by a stem $v$ so that they may be removed together.

In Fig. 2 we have shown a construction of clamping means in which the flange $f'$ serves as a clamping flange for only one of the tubes, in this instance C. The casing is shown as formed at its inner end with an integral head $w$ against which the tube D is clamped by a washer $h'$. In this construction the flange $f'$ is shown as screw-threaded on its outer surface to receive a nut $j'$ bearing against the clamping washer $h'$. As the nuts $j'$ and $i$ in this instance both screw toward the inner end of the valve to clamp the tubes, this construction may be more easily applied to the tubes after their ends are joined than that illustrated in Fig. 1.

Although we have described in detail certain embodiments of our invention, we do not wish to be limited thereto as various modifications may be made therein without departing from our invention. For instance, the casing F and shell G may be of any suitable construction and of any desired proportions, and the means for connecting the valve proper with one or the other of the tubes may be changed as desired. The clamping mechanism of the casing may be constructed in any manner which permits the independent inflation of the two tubes, although such mechanism preferably includes a flange which lies between the tubes and which is formed with a lateral opening communicating with the space between the latter. Our invention is, of course, not limited to a valve adapted for two tubes only, it being applicable to any suitable number of tubes, a separate passage being preferably provided for each tube. These and other modifications fall within the spirit of our invention.

What we claim is:—

1. In a valve, a member having a plurality of passages, a valve-proper for controlling the escape of fluid admitted to said member, and means for directing the fluid admitted to said member to one of said passages, said means establishing a leak-tight connection between said valve-proper and the other passages, and fastening means for said fluid-directing means independent of the valve-proper, said valve-proper being movable independently of said fastening-means, and said connection being maintained both during and after introduction of fluid through said member.

2. In a valve, a member having a plurality of passages, a valve shell closed at its inner end except for a single port adapted to register with either of said passages independently of the other, such port being of such small diameter that it cannot connect with more than one passage, and a valve proper in said shell above said port.

3. In a valve, a member having a plurality of passages, a valve shell having a port, a valve proper in said shell above said port, means for connecting such port and shell with either of said passages with a leak-tight joint while said valve is in operative condition, and means for closing the other of said passages.

4. In a valve, a member having a plurality of passages, a valve shell, means for securing said shell to said member with a leak-tight joint in a plurality of fixed positions and in each position to connect with only one of said passages, and a valve proper in said shell.

5. In a valve, a member having a plurality of passages, a valve shell having a fixed bottom and a port adapted to be connected with each of said passages independently, means for holding such shell on the outer end in said member in a plurality of different fixed positions corresponding to the number of such passages, whereby air may be forced into each of such passages independently through said shell.

6. In a valve, a member having a plurality of passages, a valve shell having a fixed bottom and a port adapted to be connected with each of said passages independently, means for holding such shell on the outer end of said member in a plurality of different fixed positions corresponding to the number of such passages, whereby air may be forced into each of such passages independently through said shell, and a valve proper in said shell having a clearance at all times above said bottom.

7. In a valve, a member having a plurality of passages extending longitudinally therethrough, a valve shell containing within it a valve proper, and a valve seat against which said valve proper acts, said valve shell having at its lower or inner end a single port eccentrically arranged and adapted to be connected with said passages, said port leading to said valve proper, whereby when the valve shell is in one position the port connects with one of said passages, and when the valve shell is in another position it connects with another of said passages so that a single valve proper is adapted to control the passage of air in each of said passages, and means independent of the valve proper for connecting said shell with said member with a leak-tight joint.

8. In a valve, a member having two passages, a valve shell fitting on said member in two different positions and having a port adapted to register with one of said passages when said shell is in each position, means for holding said member and shell against rotation in each position of said parts, and a valve proper controlling said port.

9. In a valve, a member having two passages, a valve shell fitting on said member in two different positions and having a port adapted to register with one of said passages when said shell is in each position, one of said parts being formed with lugs and the other with notches, and a valve proper for controlling said port.

10. In a valve, a member having two passages, a valve shell fitting on said member in two different positions and carrying a packing formed with a port adapted to register with one of said passages when said shell is in each position, means for holding said member and shell against rotation in each position of said parts, and a valve proper controlling said port.

11. In a valve, a member having two passages, a seat from which said passages lead, a valve shell carrying a packing at its inner end, a port in said packing adapted to register with one of said passages, and to close the other of said passages, means for pressing said valve shell inwardly to compress said packing against said seat, and a valve proper controlling said port.

12. In a valve, a member having two passages, a seat from which said passages lead, a valve shell having a packing at its inner end, a port in said packing adapted to register with one of said passages and to close the other of said passages, a tube in said port adapted to prevent closure thereof, means for pressing said valve shell inwardly to compress said packing against said seat, and a valve proper controlling said port.

13. In a valve, a member having two passages, a valve shell having an eccentric port adapted to register with either of said passages, and means for connecting said shell non-rotatively to said member in two positions to bring said port into registering position with each of said passages.

14. In a valve, a casing adapted to be connected with a plurality of tubes, one within the other, said casing having a plurality of shoulders on its inner end, and fastening means for clamping a tube against each of said shoulders, said means pressing against each of said shoulders and interposed tubes in the direction of the inner end of the casing.

15. In a valve, a casing adapted to be connected with a plurality of tubes one within the other, said casing having a shoulder at its inner end, a screw-threaded portion beyond said shoulder toward the outer end of the casing, a nut for clamping a tube against said shoulder, said screw-threaded portion having a shoulder, a second screw-threaded portion beyond said second shoulder toward the outer end of the casing, and a nut for clamping a second tube against said last-named shoulder, whereby said nuts press against said shoulders and interposed tubes in the direction of the inner end of the casing.

16. In a vehicle tire, the combination with a valve having a back check, of a plurality of flexible air tubes one within another, and an intervening stem attached to said valve and said tubes, said stem having ducts communicating separately with the air tubes and provision being made for connecting said valve in rotation with said ducts.

17. The combination with a plurality of flexible air tubes, of a stem having independent ducts communicating separately with said air tubes, a plug upon said stem for closing said ducts, said plug having a passage for communicating with any one of said ducts, and a valve attached to said plug; means being provided for locking said plug with its passage in communication with any desired duct.

18. In combination, a set of flexible air tubes, a stem attached to said air tubes and having separate ducts one for each tube, the upper part of said stem being in the form of a tube, a plug within said tube and having a rubber washer to close said ducts, said plug having a nozzle which may be introduced into any of said ducts, and a passage extending through the plug and communicating with said nozzle, a key upon said plug, a series of key ways upon said stem corresponding to said ducts, a nut for securing said plug, and a pump valve attached to said nut and having a back check.

19. A cylindrical plug having an eccentric nozzle and also having seated in its lower end a rubber washer through which said nozzle extends.

In witness whereof, we have hereunto signed our names in the presence of two subscribing witnesses.

HENRY P. KRAFT.
MAXIMILLIAN CHARLES SCHWEINERT.

Witnesses:
  EUGENE V. MYERS,
  THEODORE T. SNELL.

Copies of this patent may be obtained for five cents each, by addressing the "Commissioner of Patents, Washington, D. C."